(12) United States Patent
Rozen et al.

(10) Patent No.: US 8,704,555 B2
(45) Date of Patent: Apr. 22, 2014

(54) INTEGRATED CIRCUIT COMPRISING REFERENCE VOLTAGE GENERATION CIRCUITRY AND ELECTRONIC DEVICE

(75) Inventors: Anton Rozen, Gedera (IL); Dan Kuzmin, Givat Shmuel (IL); Michael Priel, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/511,321

(22) PCT Filed: Nov. 30, 2009

(86) PCT No.: PCT/IB2009/055417
§ 371 (c)(1),
(2), (4) Date: May 22, 2012

(87) PCT Pub. No.: WO2011/064623
PCT Pub. Date: Jun. 3, 2011

(65) Prior Publication Data
US 2012/0235732 A1    Sep. 20, 2012

(51) Int. Cl.
*H03B 1/00* (2006.01)
(52) U.S. Cl.
USPC ............................ 327/108; 327/293; 327/403
(58) Field of Classification Search
USPC ......... 327/293, 296, 297, 403, 494, 454, 597, 327/99, 108; 333/4, 5, 100, 113, 17.2, 28, 333/156, 238; 307/409; 375/220, 228
See application file for complete search history.

(56) References Cited

U.S. PATENT DOCUMENTS

| | | | |
|---|---|---|---|
| 6,226,330 B1 * | 5/2001 | Mansur | 375/257 |
| 6,313,670 B1 * | 11/2001 | Song et al. | 327/108 |
| 6,452,420 B1 * | 9/2002 | Wong | 326/86 |
| 6,546,343 B1 * | 4/2003 | Batra et al. | 702/64 |
| 6,891,763 B1 | 5/2005 | Han | |
| 7,016,249 B2 | 3/2006 | Ross | |
| 8,068,357 B2 * | 11/2011 | Ware et al. | 365/63 |
| 2002/0101193 A1 * | 8/2002 | Farkas et al. | 315/291 |
| 2003/0043935 A1 | 3/2003 | Noh | |
| 2006/0044883 A1 | 3/2006 | Joo | |
| 2008/0225609 A1 | 9/2008 | Lee et al. | |
| 2009/0040199 A1 | 2/2009 | Lee et al. | |

OTHER PUBLICATIONS

International Search Report and Written Opinion correlating to PCT/IB2009/055417 dated Aug. 23, 2010.

* cited by examiner

*Primary Examiner* — Lincoln Donovan
*Assistant Examiner* — Jung H Kim

(57) ABSTRACT

An integrated circuit comprises reference voltage generation circuitry for providing a reference voltage for use within a transmission of electrical signals. The reference voltage generation circuitry comprises a reference voltage node operably coupled via a plurality of resistance elements to a plurality of signal nodes such that the reference voltage node assumes as the reference voltage an average of the voltage values of the signal nodes to which it is coupled.

16 Claims, 3 Drawing Sheets

INTEGRATED CIRCUIT COMPRISING REFERENCE VOLTAGE GENERATION CIRCUITRY AND ELECTRONIC DEVICE

FIELD OF THE INVENTION

The field of this invention relates to an integrated circuit comprising reference voltage generation circuitry and an electronic device comprising such reference voltage generation circuitry. More specifically, the field of this invention relates to reference voltage generation circuitry for providing a reference voltage for use within a transmission of electrical signals

BACKGROUND OF THE INVENTION

Differential signalling is a known method of transmitting information electrically by means of two complementary signals that are transmitted over two separate paths, for example over two separate electrical paths or wires. Differential signalling provides various advantages over single-ended signalling techniques, such as its tolerance to ground offsets, suitability for use with low-voltage devices due to increased noise immunity, and resistance to electromagnetic interference through the use of balanced lines. A well known use of differential signalling is in transmission of high data rate signals, between integrated circuit devices (such as external System-on-Chip (SoC) Double Data Rate (DDR) signals).

FIG. 1 illustrates a typical example of a typical differential signalling 100. A first integrated circuit device 110 comprises a differential signal driver 120. The differential signal driver 120 is arranged to convert an input signal 105, which for the illustrated example comprises a digital input signal, into a differential signal comprising two complementary voltage signals 130, 135. The differential signal driver 120 translates the complementary voltage signals into a pair of dynamic current signals, which it transmits over a signal path comprising a pair of balanced signal lines 140, 145.

The balanced signal lines 140, 145 provide a signal path from the differential signal driver 120 of the first integrated circuit device 110 to a second integrated circuit device 150, where the balanced signal lines 140, 145 are terminated by termination elements 160, 165. The termination elements 160, 165 receive the dynamic current signals and convert the dynamic current signals into complementary voltage signals 170, 175, and provide the complementary voltage signals 170, 175 to receiver 180. The receiver 180 converts the differential signal comprising the received complementary voltage signals 170, 175 into a single ended output signal 185, which for the illustrated example comprises a digital output signal.

A problem with using differential signalling in this manner is the increased current consumption due to, for example, a DC (Direct Current) component of each of the two termination elements 160, 165, and the double swing of differential dynamic currents within the current signals 130, 135 for every signal path. Another problem with the use of differential signalling is the need for two input/output (IO) pads (not illustrated) for each signal path, which due to the high functionality of modern SoCs are limited in number and require very tight integration with numerous interfaces.

FIG. 2 illustrates a proposed solution for reducing the effect of the aforementioned problems in the form of a half-differential signalling arrangement 200. A first integrated circuit device 210 comprises a driver 220 arranged to convert an input signal 205 into a single dynamic voltage signal 230. The driver 220 also translates the dynamic voltage signal 230 into a dynamic current signal, and transmits it over a signal path comprising a single signal line 240. The single signal line 240 provides a signal path from the driver 220 of the first integrated circuit device 210 to a second integrated circuit device 250, where the single signal line 240 is terminated by termination element 260. The termination element 260 receives the dynamic current signal and converts it into complementary voltage signals 270, 275, and provides the complementary voltage signals 270, 275 to receiver 280. The receiver 280 then converts the complementary voltage signals 270, 275 into a single ended output signal 285.

In particular, the driver 220 is arranged to generate the single dynamic voltage signal 230 such that it comprises a voltage swing about a common reference voltage 235 (for example approximately half the supply voltage), which is provided over a reference voltage line 245. The reference voltage 235 is also received by termination element 260, which is able to use the common reference voltage 235 to calibrate the complementary voltage signals 270, 275. In this manner, a single common reference voltage line 245 may be used for multiple signal lines.

The half-differential approach illustrated in FIG. 2 is able to provide the benefits provided by full differential signalling, such as tolerance to ground offsets and immunity to increased noise due to the use of the common reference voltage, as well as a resistance to electromagnetic interference through the use of balanced reference voltage and signal lines. Advantageously, whilst 2*n lines (and therefore 2*n pads per integrated circuit device) are required to provide n signals using full differential signalling, the half-differential approach illustrated in FIG. 2 only requires n+1 lines (and n+1 pads per integrated circuit device). Thus, fewer signal lines and input/output (I/O) pads are required to provide the signalling between the two integrated circuit devices. Furthermore, for the full differential approach of FIG. 1, two dynamic currents are required to be consumed by termination elements 160, 165 per signal, whilst only a single current is required to be consumed by termination element 260 per signal, thereby resulting in a reduction in power consumption.

A problem with the half-differential approach illustrated in FIG. 2 is that it is difficult to generate a reliable reference voltage. Accordingly, such a solution requires a high-quality amplifier, illustrated generally at 290, for generating the reference voltage. In particular, the amplifier 290 is required to comprise a very high capability of both load and sink currents for the reference voltage generation.

One proposed solution to overcome the difficulty in generating a reliable reference voltage is to provide the reference voltage generation circuitry in a first device, for example the first integrated circuit device 210, and to provide compensation circuitry within a second integrated circuit device receiving the reference voltage, for example the second integrated circuit device 250. In this manner, the compensation circuitry is able to provide feedback to the reference voltage generation circuitry to allow for supply voltage changes and the like to be compensated for. Whilst such a solution enables a lower quality amplifier to be used to generate the reference voltage, it still requires amplifier circuitry to generate the reference voltage, in addition to the additional compensation circuitry.

SUMMARY OF THE INVENTION

The present invention provides an integrated circuit comprising reference voltage generation circuitry, and an electronic device comprising reference voltage generation circuitry, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described in terms of voltage generation circuitry for providing a reference voltage for use within a transmission of electrical signals over a data/address bus comprising, for example, a dual data rate (DDR) interface between a first system on chip (SoC) device and at least one further SoC device within an electronic device, such as a mobile telephone handset. However, the present invention is not limited to such an implementation, and may be implemented within any arrangement wherein a transmission of electrical signals requires a common reference voltage.

Furthermore, because the illustrated examples may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
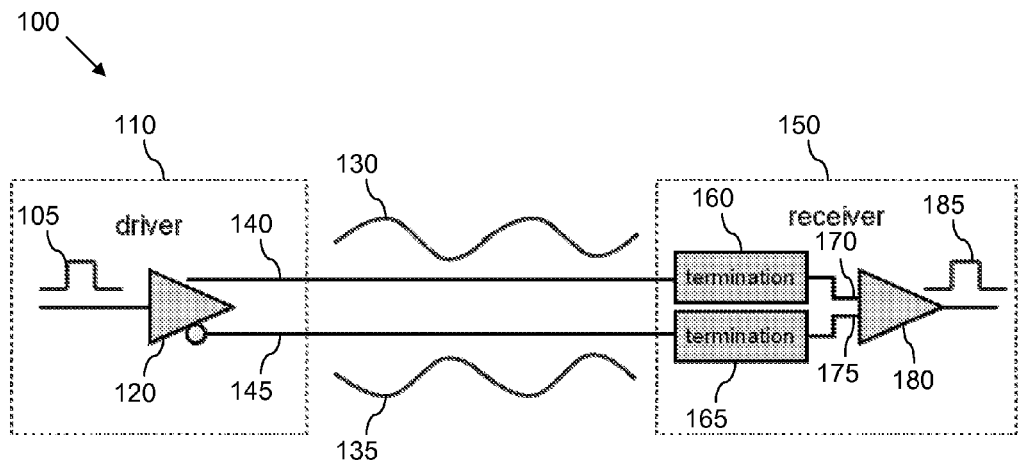
FIG. 1 illustrates an example of a typical differential signalling arrangement.
Figure 2:
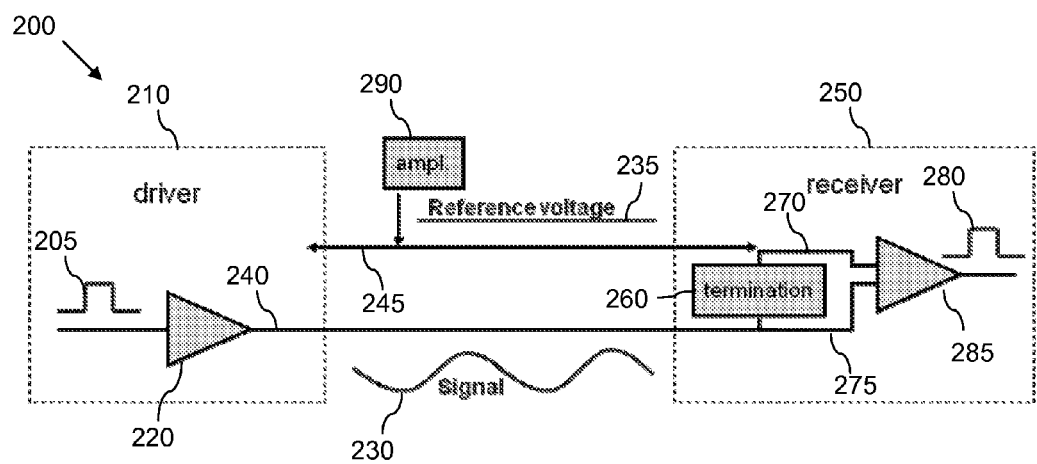
FIG. 2 illustrates a proposed half-differential signalling arrangement.
Figure 3:
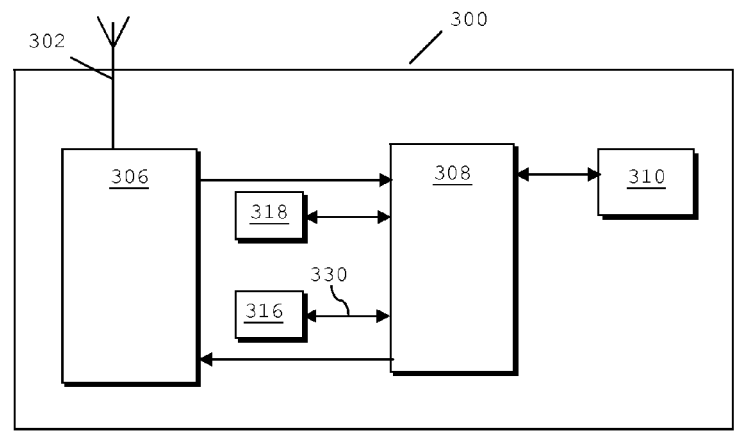
FIG. 3 illustrates an example of a simplified block diagram of part of an electronic device.

Referring to FIG. 3, there is illustrated an example of a simplified block diagram of part of an electronic device comprising a communication unit 300 adapted to support an example of the present invention. The communication unit 300, in the context of the illustrated example, is a mobile telephone handset. As such, the communication unit 300 comprises an antenna 302 and contains a variety of well known radio frequency components or circuits 306, operably coupled to the antenna 302 that will not be described further herein. The communication unit 300 further comprises signal processing module 308. An output from the signal processing module 308 is provided to a suitable user interface (UI) 310 comprising, for example, a display, keypad, microphone, speaker etc.

The signal processing module 308 is coupled to a memory element 316 that stores operating regimes, such as decoding/encoding functions and the like and may be realised in a variety of technologies such as random access memory (RAM) (volatile), (non-volatile) read only memory (ROM), Flash memory or any combination of these or other memory technologies. A timer 318 is typically coupled to the signal processing module 308 to control the timing of operations within the communication unit 300.

Modern electronic devices such as the communication unit 300 of FIG. 3 often require various high speed data paths to be supported in order to be able transmit electronic signals between various components therein at required high data rates. For example, it is typical for a signal processor, such as signal processing module 308, to be provided within a first System on Chip (SoC) integrated circuit device, whilst a memory element, such as memory element 316, is provided within a second SoC integrated circuit device. Communication between the signal processing module 308 and the memory element 316 is typically realised by way of high data rate signals, for example in a form of a data/address bus or the like, illustrated generally at 330.

Figure 4:
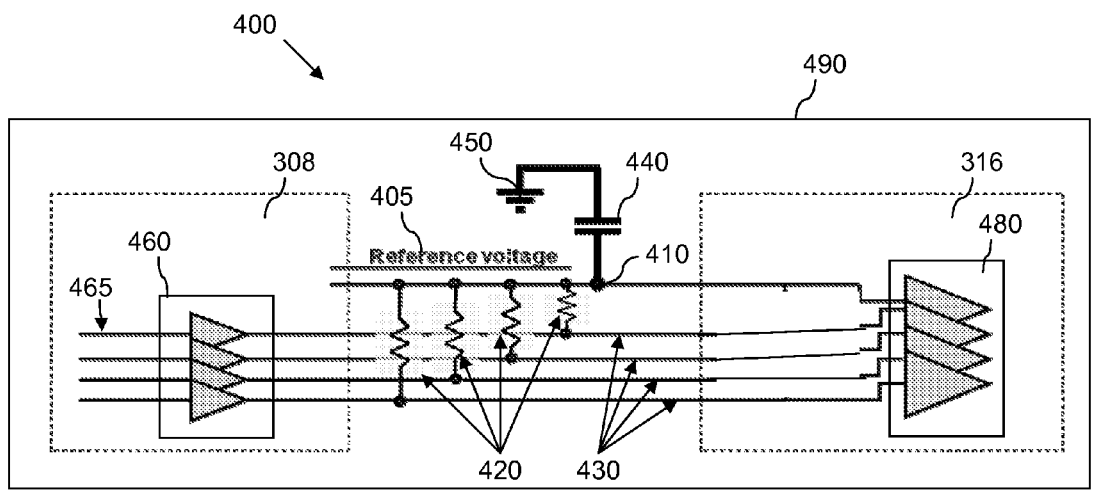
FIG. 4 illustrates a simplified block diagram of an example circuit for implementing high speed signalling comprising an example of reference voltage generation circuitry.

Referring now to FIG. 4, there is illustrated a simplified block diagram of an example of implementing high speed signalling between a first SoC device and at least one further SoC device. In particular, the example illustrated in FIG. 4 comprises half-differential signalling. As such, a first integrated circuit device, which for the illustrated example may comprise the signal processing module 308 of FIG. 3, comprises driver 460 arranged to convert a plurality of digital input signals 465 into a plurality of complementary voltage signals. The driver 460 translates the plurality of complementary voltage signals into a plurality of dynamic current signals, and transmits them over a plurality of signal paths comprising signal lines 430. The signal lines 430 provide signal paths from the driver 460 of the first integrated circuit device comprising the signal processing module 308 to a second integrated circuit device, which for the illustrated example may comprise the memory element 316 of FIG. 3. Resistance elements 420 are configured to control respective values of the dynamic current signals that are passed on to a receiver 480. The receiver 480 converts the dynamic current signals into complementary voltage signals, and provides the complementary voltage signals into digital output signals. For the illustrated example, the first and second integrated circuit devices 308, 316 are located on a single electronic circuit device 490, such as a printed circuit board (PCB) or the like.

In particular, the driver 460 of the first integrated circuit device is arranged to generate the complementary voltage signals, such that they comprises a voltage swing about a common reference voltage 405 (for example approximately half a supply voltage), which is provided over a reference voltage line 410. The common reference voltage 405 is also applied to the receiver 480 within the second integrated circuit device, which is able to use the common reference voltage 405 to calibrate the complementary voltage signals converted from the received dynamic current signals. In this manner, a single common reference voltage line 410 may be used for multiple signal lines 430.

The half-differential approach illustrated in FIG. 4 is able to provide the benefits provided by full differential signalling, such as tolerance to ground offsets and immunity to increased noise due to the use of the common reference voltage, as well as a resistance to electromagnetic interference through the use of balanced reference voltage and signal lines. Advantageously, whilst 2*n lines (and 2*n pads per integrated circuit device) are required to provide n signals using full differential signalling, the half-differential approach illustrated in FIG. 4 only requires n+1 lines (and n+1 pads per integrated circuit device). Thus, fewer signal lines and I/O pads are required to provide the signalling between the two integrated circuit devices. Furthermore, in this example, for full differential signalling, two dynamic currents are required to be consumed by termination elements per signal, whilst only a single current is required to be consumed by a single termination element per signal with half-differential signalling, resulting in a significant reduction in power consumption.

FIG. 4 further illustrates reference voltage generation circuitry 400 for providing the reference voltage 405 for use within the transmission of electrical signals between, say, the integrated circuit devices 308, 316. The reference voltage generation circuitry 400 comprises a reference voltage node, which for the illustrated example comprises the reference voltage line 410, operably coupled via resistance elements, for example in a form of resistors, 420 to a plurality of signal nodes, which for the illustrated example comprise signal lines 430.

The signal nodes 430 comprise voltage values that vary with the signals being transmitted. The signals are transmitted over the signal lines 430 by way of dynamic currents and, as such, during the transmission of signals the signal nodes 430 comprise dynamic voltage values that will vary between, say, ground and a supply voltage. Accordingly, it may be assumed that over a protracted period of time the average voltage value of any single signal node 430 will be approximately equal to half the supply voltage. Furthermore, it may be assumed that at any moment the average voltage value of the plurality of signal nodes 430 will be approximately equal to half the supply voltage. Thus, by being coupled to the signal nodes 430 via resistances 420, the reference voltage node 410 adopts as the reference voltage 405 an 'average' of the voltage values of the signal nodes 430 to which it is coupled, and thus will adopt a substantially constant voltage value approximately equal to half the supply voltage.

In a case where all resistances 420 comprise a substantially equal resistive value, the reference voltage 405 adopted by the reference node 410 will comprise a substantially average in the strict mathematical sense, of the voltage values of the plurality of signal nodes 430. However, in other examples, it is contemplated that the resistances 420 may also comprise differing resistive values, for example in order to provide a bias towards or against some of the voltage values of the signal nodes 430. Accordingly, whilst for such a scenario the reference voltage 405 adopted by the reference node 410 may not comprise an average of the voltage values of the signal nodes 430 in a strict mathematical sense, the reference voltage 405 adopted by the reference node 410 will still be based on the combined effects of the voltage values of the signal nodes 430. Accordingly, it is to be understood that the use of the term 'average' used herein in relation to the effect of the voltage values of the plurality of signal nodes 430 on the reference voltage node 430 is not limited to the strict mathematical sense, but rather also extends to a broader sense as outlined above.

Significantly, the reference voltage generation circuitry 400 of FIG. 4 provides a common reference voltage to the integrated circuit devices for use within the transmission of electrical signals there between without the need for amplifier circuitry to generate a reference voltage. Furthermore, since the reference voltage 405 is based on an average of the voltage values of the signal nodes 430, which comprise voltage values that typically swing between a supply voltage and ground, any variations in the supply voltage will be dynamically compensated for within the reference voltage without the need for additional compensation circuitry.

For the illustrated example, the reference voltage node 410 is further operably coupled to a ground plane 450 via a capacitance 440. The capacitance 440, which may comprise a capacitance of, say, several microfarads, provides a stabilising effect on the reference voltage 405 of the reference voltage node 410. The capacitance 440 further provides improved averaging over time of the reference voltage 405, and smoothing of non-balanced data transfer periods where the voltage values of the signal nodes 430 are not evenly balanced around half the supply voltage.

Figure 5:
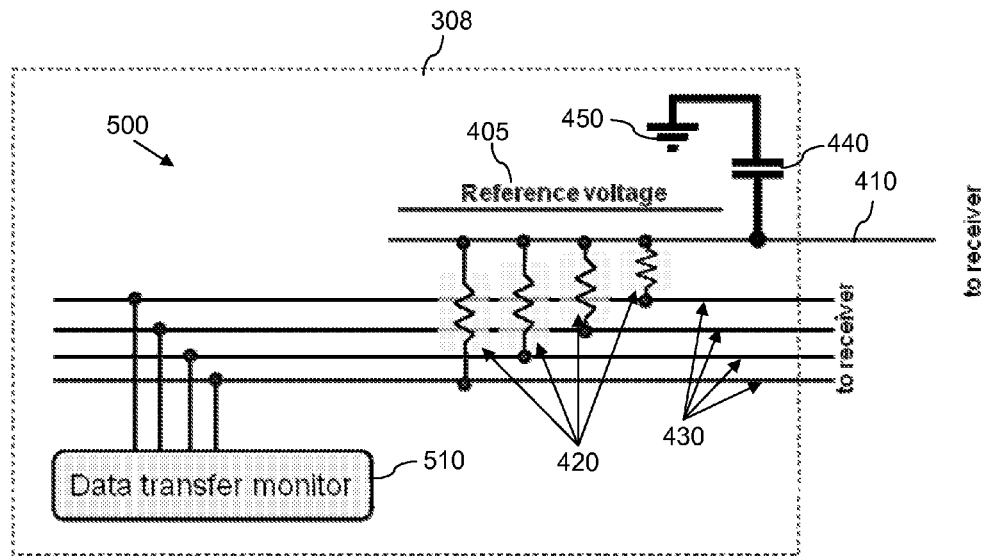
FIG. 5 illustrates an alternative example of reference voltage generation circuitry.

Referring now to FIG. 5, there is illustrated an alternative example of reference voltage circuitry 500. For clarity, the same reference numerals have been used for those features common to both FIG. 4 and FIG. 5. In the same manner as for the example illustrated in FIG. 4, the reference voltage circuitry 500 is arranged to provide a reference voltage 405 for use within the transmission of electrical signals between a first integrated circuit device 308 and one or more further integrated circuit devices (not illustrated). The reference voltage generation circuitry 500 comprises a reference voltage node, which for the illustrated example comprises reference voltage line 410, operably coupled via resistances 420 to a plurality of signal nodes, which for the illustrated example comprise signal lines 430. For the example illustrated in FIG. 5, the reference voltage circuitry 500 forms a part of the integrated circuit device 308.

Although it may be assumed that over a protracted period of time the average voltage value of any single signal node 430 will be approximately equal to half the supply voltage, and that at any moment the average voltage value of the plurality of signal nodes 430 will be approximately equal to half the supply voltage, due to the potentially arbitrary nature of the voltage values on the plurality of the signal nodes 430 it is possible that the average voltage value adopted by the reference voltage node 410 may stray from a desired reference value, for example half the supply voltage value.

Accordingly, for the example illustrated in FIG. 5, the reference voltage circuitry 500 further comprises a data transfer monitor 510 arranged to monitor signals being transmitted over the signal lines 430 in order to determine whether any correction is required to be applied to the reference voltage. Since the voltage values of the signal lines 430 comprise a substantially direct relationship to the data being transmitted, by monitoring the data being transmitted an indication of the average voltage values for the signal nodes may be obtained, and thus an indication of the reference voltage 405 adopted by the reference voltage node 410.

For example, the data transfer monitor 510 may be arranged to count states of signals transmitted over each signal line 430. In this manner, if after a certain number of cycles a number of 'high' states counted does not match a number of 'low' (or 'zero') states counted, the data transfer monitor 510 may determine that the mismatch between the 'high' states and 'low' states counted is sufficient to cause the reference voltage 405 to stray from a desired voltage value of, say, substantially half the supply voltage, and that a correction is required. For example, if the difference between the number of 'high' states counted and the number of 'low' states counted exceeds a threshold number, the data transfer monitor 510 may determine that the difference is sufficient to cause the reference voltage 405 to stray from a desired voltage value, and that a correction is required to be applied to the reference voltage 410.

In one example, correction of the reference voltage 405 may be achieved during periods when one or more of the signal lines 430 are unused, for example during an IDLE state of a bus when data lines are unused, and such unused data lines may have any value applied to them. In this manner, the data transfer monitor 510 may be arranged to apply a 'high' state or a 'low' state to unused signal lines in order to correct for any determined straying of the reference voltage 405 from the desired voltage value. For example, if after a certain number of cycles, the data transfer monitor 510 counts more 'high' states than 'low' states by greater than a predetermined threshold number, it may determine that the reference voltage 405 will have strayed above the desired voltage value. Accordingly, during a subsequent period when one or more signal lines 430 are unused, the data transfer monitor 510 may cause 'low' states to be applied to the unused signal lines in order to correct the reference voltage 405. Conversely, if after a certain number of cycles, the data transfer monitor 510 counts more 'low' states than 'high' states by greater than a predetermined threshold number, it may determine that the reference voltage 405 will have strayed below the desired voltage value. Accordingly, during a subsequent period when one or more signal lines 430 are unused, the data transfer monitor 510 may cause 'high' states to be applied to the unused signal lines in order to correct the reference voltage 405.

Significantly, the data transfer monitor 510 may monitor the states applied to the signal lines 430 within the digital domain, for example by way of the digital input signals 465 illustrated in FIG. 4. In this manner, no additional and relatively cumbersome analogue circuitry is required, since such data transfer monitoring may be performed by way of digital circuitry located on the integrated circuit device.

Figure 6:
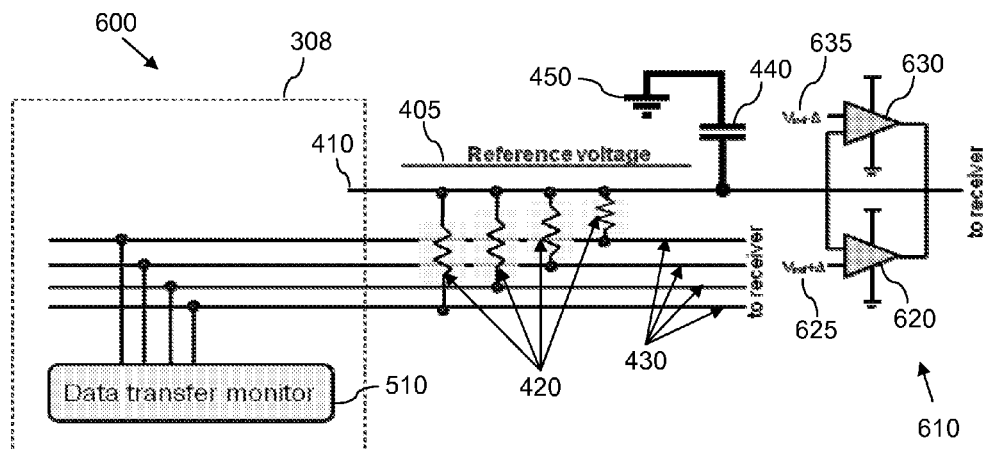
FIG. 6 illustrates a further alternative example of reference voltage generation circuitry.

Referring now to FIG. 6, there is illustrated a further alternative example of reference voltage circuitry 600. For clarity, the same reference numerals have been used for those features common to FIGS. 4, 5 and 6. In the same manner as for the examples illustrated in FIGS. 4 and 5, the reference voltage circuitry 600 is arranged to provide a reference voltage 405 for use within the transmission of electrical signals between a first integrated circuit device 308 and one or more further integrated circuit devices (not illustrated). The reference voltage generation circuitry 600 comprises a reference voltage node, which for the illustrated example comprises reference voltage line 410, operably coupled via resistances 420 to a plurality of signal nodes, which for the illustrated example comprise signal lines 430. Furthermore, the reference voltage circuitry 600 further comprises a data transfer monitor 510 arranged to monitor signals being transmitted over the signal lines 430 in order to determine whether any correction is required to be applied to the reference voltage 405, and if it is determined that a correction is required to be applied to the reference voltage 405 to effect such a correction. For the example illustrated in FIG. 6, with the exception of the data transfer monitor 510, the reference voltage circuitry 600 is provided predominantly external to the integrated circuit device 308.

In addition to the data transfer monitor 510, the reference voltage generation circuitry 600 of FIG. 6 further comprises pull-up/pull-down comparator circuitry 610. The pull-up/pull-down comparator circuitry 610 comprises a first comparator circuit 620 arranged to compare the reference voltage 405 to a first reference threshold value 625, and if the reference voltage 405 is above the first reference threshold value 625 to 'pull-down' the reference voltage 405. The pull-up/pull-down comparator circuitry 610 further comprises a second comparator 630 arranged to compare the reference voltage 405 to a second reference threshold value 635, and if the reference voltage 405 is below the second reference threshold value 635 to 'pull-down' the reference voltage 405. In this manner, the pull-up/pull-down comparator circuitry 610 provides a mechanism for 'coarse' correction of the reference voltage 405. Whilst such pull-up/pull-down comparator circuitry 610 is provided by analogue circuitry in one example, such circuitry is significantly simpler and cheaper than amplifier circuitry that would otherwise be required to generate a reference voltage, and as such does not negate the benefits afforded by the present invention.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation; a single operation may be distributed in additional operations and operations may be executed at least partially overlapping in time. Moreover, alternative embodiments may include multiple instances of a particular operation, and the order of operations may be altered in various other embodiments.

Also for example, in some embodiments, circuitry such as the data transfer monitor 510, pull-up/pull-down comparator circuitry 610, etc., may be implemented as circuitry located on a single integrated circuit or within a same device. Alternatively, in some embodiments, circuitry such as the data transfer monitor 510, pull-up/pull-down comparator circuitry 610, etc., may be implemented within any number of separate integrated circuits or separate devices interconnected with each other in a suitable manner.

Also for example, in some embodiments, circuitry such as the data transfer monitor 510, pull-up/pull-down comparator circuitry 610, etc., or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit comprising reference voltage generation circuitry for providing a reference voltage for use within a transmission of electrical signals, the reference voltage generation circuitry comprising a reference voltage node coupled via a plurality of resistance elements to a plurality of signal nodes such that the reference voltage node assumes as the reference voltage an average of voltage values of the signal nodes to which it is coupled, wherein the reference voltage generation circuitry further comprises a data transfer monitor coupled to the reference voltage node and arranged to monitor signals being transmitted, and determine therefrom whether any correction is required to be applied to the reference voltage based at least partly on the signals being transmitted, and wherein the data transfer monitor is arranged to count a number of states of signals transmitted, and compare the count to a threshold value to determine whether to apply a correction to the reference voltage.

2. An integrated circuit comprising reference voltage generation circuitry for providing a reference voltage for use within a transmission of electrical signals, the reference voltage generation circuitry comprising a reference voltage node coupled via a plurality of resistance elements to a plurality of signal nodes such that the reference voltage node assumes as the reference voltage an average of voltage values of the signal nodes to which it is coupled, wherein the reference voltage generation circuitry further comprises pull-up/pull-down comparator circuitry coupled to the reference voltage node, the pull-up/pull-down comparator circuitry comprising:

a first comparator circuit arranged to compare the reference voltage to a first reference threshold, and if the reference voltage is above the first reference threshold to pull-down the reference voltage; and a second comparator circuit arranged to compare the reference voltage to a second reference threshold, and if the reference voltage is below the second reference threshold to pull-up the reference voltage.

3. The integrated circuit of claim 1 wherein at least a number of the plurality of signal nodes are arranged to form a part of a high speed signal path for conveying dynamic signals, each dynamic signal comprising a voltage swing about the reference voltage.

4. The integrated circuit of claim 3 wherein the number of signal nodes form at least part of a data and/or address bus.

5. The integrated circuit of claim 4 wherein the number of signal nodes form at least a part of a double data rate (DDR) interface.

6. The integrated circuit of claim 1 wherein the reference voltage generation circuitry forms part of one of the group consisting of: a signal processing integrated circuit and a memory integrated circuit.

7. An electronic device comprising reference voltage generation circuitry for providing a reference voltage for use within a transmission of electrical signals, the reference voltage generation circuitry comprising:

a reference voltage node coupled via resistors to a plurality of signal nodes such that the reference voltage node assumes as the reference voltage an average of the voltage values of the signal nodes to which it is coupled; and pull-up/pull-down comparator circuitry coupled to the reference voltage node, the pull-up/pull-down comparator circuitry comprising:

a first comparator circuit arranged to compare the reference voltage to a first reference threshold, and if the reference voltage is above the first reference threshold to pull-down the reference voltage; and a second comparator circuit arranged to compare the reference voltage to a second reference threshold, and if the reference voltage is below the second reference threshold to pull-up the reference voltage.

8. The electronic device of claim 7 wherein the reference voltage generation circuitry further comprises a capacitance coupled between the reference voltage node and a ground plane.

9. The electronic device of claim 8 wherein the data transfer monitor is arranged to count a number of states of signals transmitted, and compare the count to a threshold value to determine whether to apply a correction to the reference voltage.

10. The electronic device of claim 8 wherein the reference voltage generation circuitry further comprises a data transfer monitor coupled to the reference voltage node and arranged to monitor signals being transmitted, and determine therefrom whether any correction is required to be applied to the reference voltage based at least partly on the signals being transmitted.

11. An integrated circuit comprising:
  a plurality of signal nodes, each signal node of the plurality of signal nodes comprising a single signal line; and
  a reference voltage generation circuit for providing a reference voltage for the plurality of signal nodes, the reference voltage generation circuit comprising:
    a reference voltage node;
    a plurality of resistance elements, wherein each resistance element of the plurality of resistance elements is coupled between the reference voltage node and an associated signal node of the plurality of signal nodes, such that the reference voltage is an average of a plurality of voltage values of the plurality of signal nodes; and
    pull-up/pull-down comparator circuitry coupled to the reference voltage node, the pull-up/pull-down comparator circuitry comprising:
      a first comparator circuit arranged to compare the reference voltage to a first reference threshold, and if the reference voltage is above the first reference threshold to lower the reference voltage; and
      a second comparator circuit arranged to compare the reference voltage to a second reference threshold, and if the reference voltage is below the second reference threshold to raise the reference voltage.

12. The integrated circuit of claim 11 wherein the reference voltage generation circuitry further comprises a capacitance coupled between the reference voltage node and a ground plane.

13. An integrated circuit comprising:
  a plurality of signal nodes, each signal node of the plurality of signal nodes comprising a single signal line; and
  a reference voltage generation circuit for providing a reference voltage for the plurality of signal nodes, the reference voltage generation circuit comprising:
    a reference voltage node;
    a plurality of resistance elements, wherein each resistance element of the plurality of resistance elements is coupled between the reference voltage node and an associated signal node of the plurality of signal nodes, such that the reference voltage is an average of a plurality of voltage values of the plurality of signal nodes; and
    a data transfer monitor coupled to the reference voltage node and arranged to monitor signals being transmitted over the plurality of signal nodes, and to determine whether to apply a correction to the reference voltage based on the signals being transmitted, wherein the data transfer monitor is arranged to count a number of states of signals transmitted, and compare the count to a threshold value to determine whether to apply the correction to the reference voltage.

14. The integrated circuit of claim 13 wherein the reference voltage generation circuitry further comprises pull-up/pull-down comparator circuitry coupled to the reference voltage node, the pull-up/pull-down comparator circuitry comprising:
  a first comparator circuit arranged to compare the reference voltage to a first reference threshold, and if the reference voltage is above the first reference threshold to lower the reference voltage; and
  a second comparator circuit arranged to compare the reference voltage to a second reference threshold, and if the reference voltage is below the second reference threshold to raise the reference voltage.

15. The integrated circuit of claim 11 wherein a number of signal nodes of the plurality of signal nodes are arranged to form a high speed signal path for conveying a plurality of dynamic signals, each dynamic signal comprising a voltage swing about the reference voltage.

16. The integrated circuit of claim 15 wherein the number of signal nodes form a part of a data and an address bus.

* * * * *